US008676837B2

(12) United States Patent
Bharat et al.

(10) Patent No.: US 8,676,837 B2
(45) Date of Patent: Mar. 18, 2014

(54) SYSTEMS AND METHODS FOR PERSONALIZING AGGREGATED NEWS CONTENT

(75) Inventors: Krishna Bharat, Santa Clara, CA (US); Michael Schmitt, Mountain View, CA (US); Mike Curtiss, Sunnyvale, CA (US); Marissa Mayer, Palo Alto, CA (US); Kerah Pelczarski, Mountain View, CA (US); Brian Rakowski, Menlo Park, CA (US); Anurag Acharya, Campbell, CA (US)

(73) Assignee: Google Inc., Mountain View, CA (US)

( * ) Notice: Subject to any disclaimer, the term of this patent is extended or adjusted under 35 U.S.C. 154(b) by 218 days.

(21) Appl. No.: 10/748,663

(22) Filed: Dec. 31, 2003

(65) Prior Publication Data

US 2005/0165743 A1 Jul. 28, 2005

(51) Int. Cl.
*G06F 17/30* (2006.01)

(52) U.S. Cl.
USPC .......................................... 707/770; 707/706

(58) Field of Classification Search
USPC .................... 707/1–10, 100–104.1, 200–205, 707/650–660, 706, 770
See application file for complete search history.

(56) References Cited

U.S. PATENT DOCUMENTS

| | | | |
|---|---|---|---|
| 5,634,051 A | 5/1997 | Thomson | |
| 6,098,064 A | 8/2000 | Pirolli et al. | |
| 6,363,398 B1 | 3/2002 | Andersen | |
| 6,381,594 B1 * | 4/2002 | Eichstaedt et al. | 707/3 |
| 6,516,337 B1 | 2/2003 | Tripp et al. | |
| 6,564,251 B2 * | 5/2003 | Katariya et al. | 709/214 |
| 6,581,072 B1 | 6/2003 | Mathur et al. | |
| 6,643,661 B2 | 11/2003 | Polizzi et al. | |
| 6,691,106 B1 * | 2/2004 | Sathyanarayan | 707/3 |
| 6,868,525 B1 * | 3/2005 | Szabo | 715/738 |
| 6,961,712 B1 | 11/2005 | Perkowski | |
| 6,981,040 B1 | 12/2005 | Konig et al. | |
| 6,990,633 B1 * | 1/2006 | Miyasaka et al. | 715/517 |
| 7,058,944 B1 | 6/2006 | Sponheim et al. | |

(Continued)

FOREIGN PATENT DOCUMENTS

| | | |
|---|---|---|
| EP | 0 889 421 A1 | 1/1999 |
| EP | 1 176 520 A2 | 1/2002 |
| JP | 2001-312509 A | 11/2001 |
| JP | 2002-123463 | 4/2002 |

OTHER PUBLICATIONS

Bharat et al. "Personalized, interactive news on the Web", Multimedia Systems, vol. 6, No. 5, pp. 349-358, 1998, http://springerlink.metapress.c.pdf>.

(Continued)

*Primary Examiner* — Hosain Alam
*Assistant Examiner* — Navneet K Ahluwalia
(74) *Attorney, Agent, or Firm* — Harrity & Harrity, LLP

(57) ABSTRACT

A system customizes a news document associated with a user of a news aggregation service. The system includes multiple news source servers that store news content and a remote news aggregation server. The news aggregation server creates a customized news document based on one or more personalized search queries received from a user. The news aggregation server fetches the news content from the multiple news source servers, aggregates the news content, and searches the aggregated news content based on the one or more personalized search queries. The news aggregation server provides selected news content to the customized news document based on results of the search.

39 Claims, 9 Drawing Sheets

(56) References Cited

U.S. PATENT DOCUMENTS

| | | | |
|---|---|---|---|
| 7,085,944 | B1 | 8/2006 | Hamilton |
| 7,483,871 | B2 * | 1/2009 | Herz .................................... 1/1 |
| 2001/0037248 | A1 | 11/2001 | Klein |
| 2002/0035501 | A1 * | 3/2002 | Handel et al. .................... 705/10 |
| 2002/0073399 | A1 | 6/2002 | Golden |
| 2002/0091789 | A1 * | 7/2002 | Katariya et al. ............. 709/214 |
| 2002/0103809 | A1 | 8/2002 | Starzl et al. |
| 2002/0124055 | A1 | 9/2002 | Reisman |
| 2003/0009497 | A1 * | 1/2003 | Yu ................................ 707/513 |
| 2003/0074352 | A1 * | 4/2003 | Raboczi et al. .................... 707/4 |
| 2003/0084048 | A1 | 5/2003 | Dweck et al. |
| 2003/0093417 | A1 | 5/2003 | Kagimasa et al. |
| 2004/0006743 | A1 | 1/2004 | Oikawa et al. |
| 2004/0059705 | A1 * | 3/2004 | Wittke et al. ...................... 707/1 |
| 2005/0005237 | A1 | 1/2005 | Rail et al. |
| 2005/0027666 | A1 | 2/2005 | Beck et al. |
| 2005/0033657 | A1 * | 2/2005 | Herrington et al. ............. 705/26 |
| 2005/0065908 | A1 * | 3/2005 | Silverbrook et al. ............. 707/1 |
| 2005/0137996 | A1 | 6/2005 | Billsus et al. |
| 2005/0138036 | A1 | 6/2005 | Sizemore, Jr. |
| 2005/0138049 | A1 * | 6/2005 | Linden ......................... 707/100 |

OTHER PUBLICATIONS

Manber et al. "Experience with personalization on yahoo", Communications of the ACM, vol. 43, No. 8, pp. 35-39, 2000, http://delivery.acm.org/10.1145.pdf>.

Tara Calishain et al., "Google Hacks—100 Selected Techniques and Tools used by Professionals", O'Reily Japan Co. Ltd., Aug. 20, 2003, pp. 97-99, 143-146. (Includes partial English translation).

Tomonari Kanba et al., "Information Order Made for Each Individual—Personalization Technology—Electronic Data Communication Academic Journal", Japan, Institute of Electronics, Information and Communication Engineers, Apr. 25, 1999, vol. 82, No. 4, pp. 354-359. (Includes partial English translation).

Tomonari Kanba, "Personal Electronic Newspaper", NEC Creating Co. Ltd., Jul. 30, 1996, vol. 49, No. 7, pp. 11-16. (Includes partial English translation).

Tomonari Kanba, "The Krakatoa Chronicle: Interactive Type Personal Newspaper Using WWW Agent Functions", Information Processing Society of Japan Research, Institute of Electronics, Information and Communication Engineers, Dec. 1, 1995, vol. 95, No. 115, pp. 13-18. (Includes partial English translation).

* cited by examiner

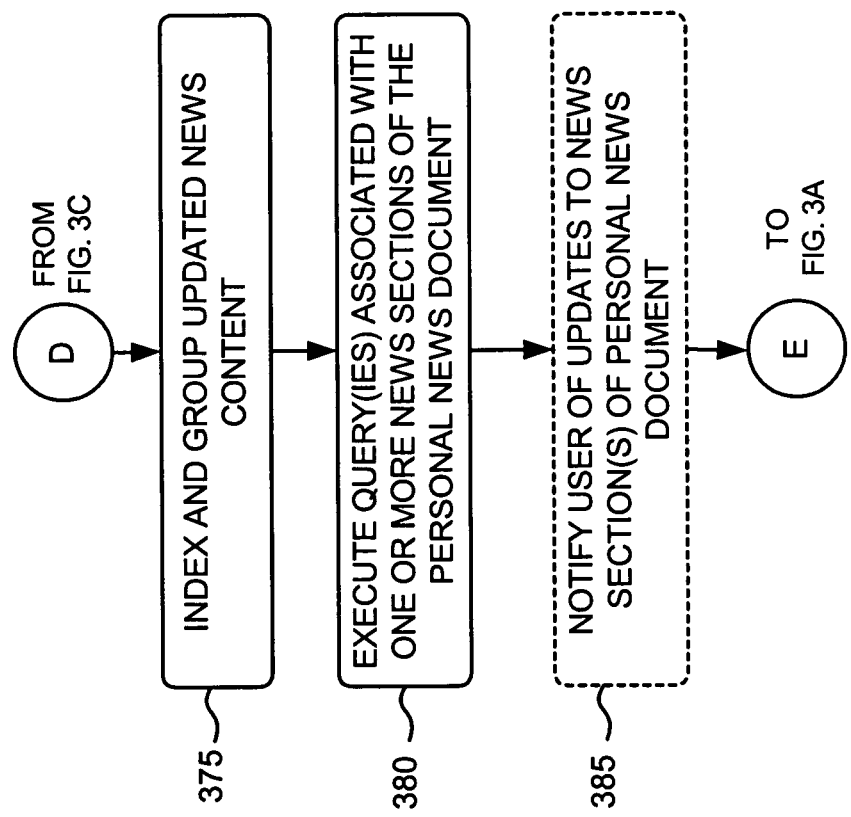

SYSTEMS AND METHODS FOR PERSONALIZING AGGREGATED NEWS CONTENT

BACKGROUND OF THE INVENTION

1. Field of the Invention

The present invention relates generally to information aggregation systems and, more particularly, to systems and methods for personalizing news content aggregated by a news aggregation service.

2. Description of Related Art

Existing news aggregation services (e.g., Google News) search out, and aggregate, news content published on web pages throughout the Internet. In response to a search query from a user, or when a user browses a newspaper section of the news aggregation service, the news aggregation service presents a list of stories, from the aggregated news content, relevant to the query or to the newspaper section requested, with each story involving a group of articles from different publications dealing with the same topic. To keep abreast of developments in the news, users must periodically access the news aggregation service, re-enter a search query and view relevant news stories.

Accordingly, it would be desirable to implement a news browsing service that automatically provides news content to a user based on previously stored user search and display criteria.

SUMMARY OF THE INVENTION

Systems and methods, consistent with the principles of the invention, implement a news browsing service that may store user news content searches and use these previously stored searches to automatically, and periodically, provide a personal news document, such as, for example, a personal news web page, to the user that includes personalized news content. The personal news document may be hosted on the news aggregation server, or on a personal document server associated with the user. The user may customize the content and format of the personal news document via a user interface implemented at a server associated with the news browsing service or at a client associated with the user.

According to one aspect consistent with the principles of the invention, a method of customizing a news web page associated with a user of a news aggregation service is provided. The method includes creating the customized news web page with one or more personalized search queries received from the user. The method further includes fetching news content from multiple news source servers, aggregating the news content, and searching the aggregated news content based, at least in part, on the one or more personalized search queries. The method also includes providing selected news content to the customized news web page based, at least in part, on results of the search.

According to another aspect, a method of creating a personalized news document is provided. The method includes receiving multiple search queries from a user and creating a customized news document including multiple personalized news sections, with each news section being associated with a different one of the multiple search queries. The method further includes retrieving news content from memory using the multiple search queries and inserting selected news content of the retrieved news content into each of the personalized news sections of the customized news document.

According to a further aspect, a method of providing news content to a personalized news document via a news aggregation server is provided. The method includes associating multiple search queries with a user and maintaining the multiple search queries in a memory associated with the news aggregation server. The method further includes periodically searching aggregated news content using the multiple search queries and periodically providing selected news content to a news document associated with the user using results from the periodic searches of the aggregated news content.

BRIEF DESCRIPTION OF THE DRAWINGS

The accompanying drawings, which are incorporated in and constitute a part of this specification, illustrate an embodiment of the invention and, together with the description, explain the invention. In the drawings.

FIGS. 3A, 3B, 3C and 3D are flowcharts of exemplary processing for creating and updating personalized news documents according to an implementation consistent with the principles of the invention;

DETAILED DESCRIPTION

The following detailed description of the invention refers to the accompanying drawings. The same reference numbers in different drawings may identify the same or similar elements. Also, the following detailed description does not limit the invention.

Systems and methods consistent with the principles of the invention implement a news browsing service that stores user news content searches and uses these previously stored searches to automatically, and periodically, provide a personal news document, such as, for example, a personal news web page, to the user that includes personalized news content. The content and format of the personal news document may be customized by the user.

A "document," as the term is used herein is to be broadly interpreted to include any machine-readable and machine-storable work product. A document may include an e-mail, a web site, a file, a combination of files, one or more files with embedded links to other files, a news group posting, a blog, a web advertisement, etc. In the context of the Internet, a common document is a web page. Web pages often include textual information and may include embedded information (such as meta information, images, hyperlinks, etc.) and/or embedded instructions (such as Javascript, etc.).

Exemplary Network Configuration

Figure 1:
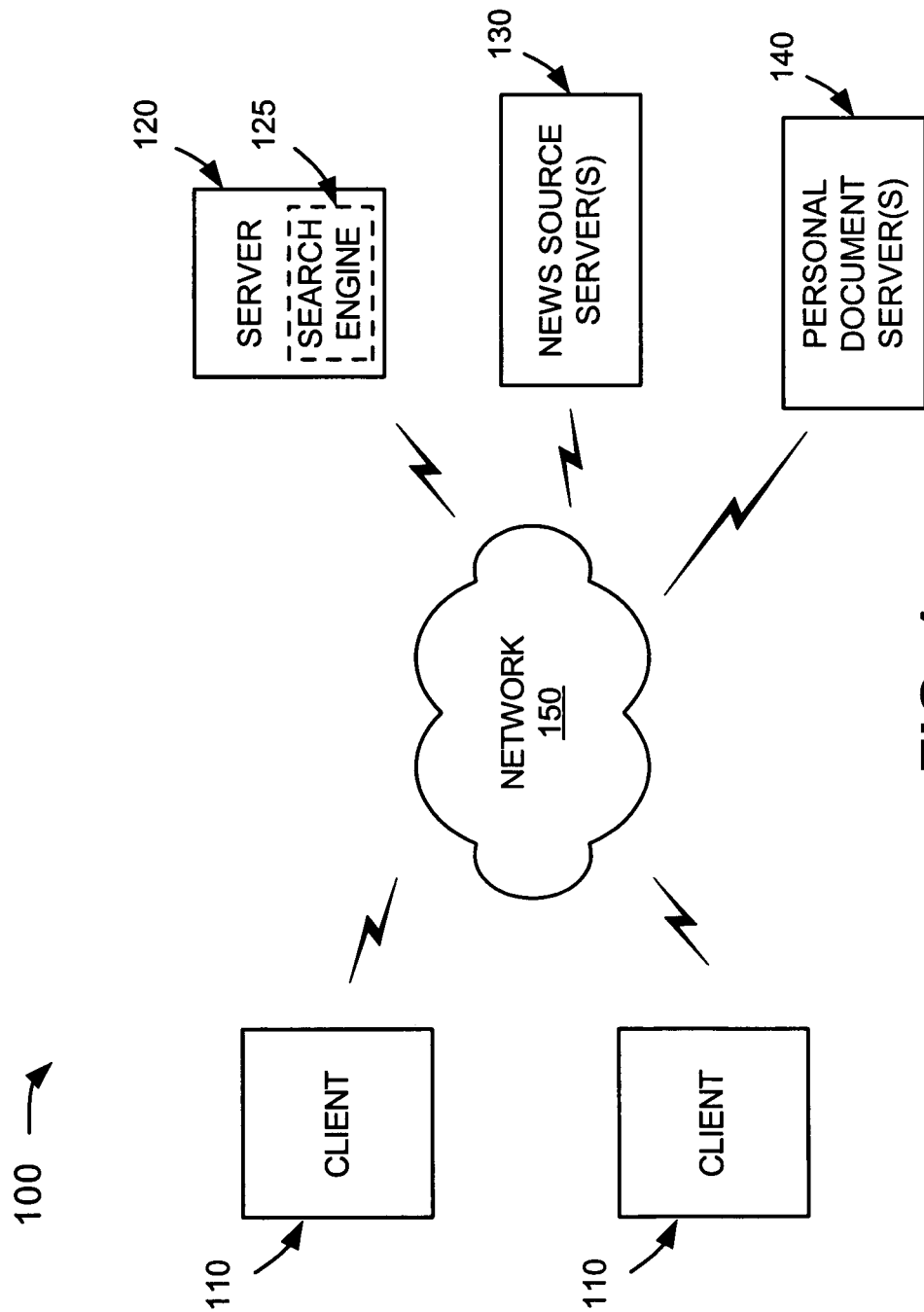
FIG. 1 is a diagram of an exemplary network in which systems and methods consistent with the principles of the invention may be implemented.

FIG. 1 is an exemplary diagram of a network 100 in which systems and methods consistent with the principles of the invention may be implemented. Network 100 may include multiple clients 110 connected to multiple servers 120-140 via a network 150. Network 150 may include a local area network (LAN), a wide area network (WAN), a telephone network, such as the Public Switched Telephone Network (PSTN), an intranet, the Internet, a memory device, another type of network, or a combination of networks. Two clients 110 and three servers 120-140 have been illustrated as connected to network 150 for simplicity. In practice, there may be more or fewer clients and servers. Also, in some instances, a client may perform the functions of a server and a server may perform the functions of a client.

Clients 110 may include client entities. An entity may be defined as a device, such as a wireless telephone, a personal computer, a personal digital assistant (PDA), a laptop, or another type of computation or communication device, a thread or process running on one of these devices, and/or an object executable by one of these device. Servers 120-140 may include server entities that gather, process, search, and/or maintain documents in a manner consistent with the principles of the invention. Clients 110 and servers 120-140 may connect to network 150 via wired, wireless, and/or optical connections.

In an implementation consistent with the principles of the invention, server 120 may include a search engine 125 usable by users at clients 110. Server 120 may implement a news aggregation service by crawling a corpus of news content documents (e.g., web pages) hosted on news source server(s) 130 and store information associated with these news content documents in a repository of crawled documents. Server(s) 130 may store or maintain news content documents that may be crawled by server 120. Such news content documents may include recently published news stories, or older (i.e., not recent), archived news stories. Personal document server(s) 140 may host documents for various users associated with clients 110. Such documents may include content customized by each individual user.

While servers 120-140 are shown as separate entities, it may be possible for one or more of servers 120-140 to perform one or more of the functions of another one or more of servers 120-140. For example, it may be possible that two or more of servers 120-140 are implemented as a single server. It may also be possible for a single one of servers 120-140 to be implemented as two or more separate (and possibly distributed) devices.

Exemplary Client/Server Architecture

Figure 2:
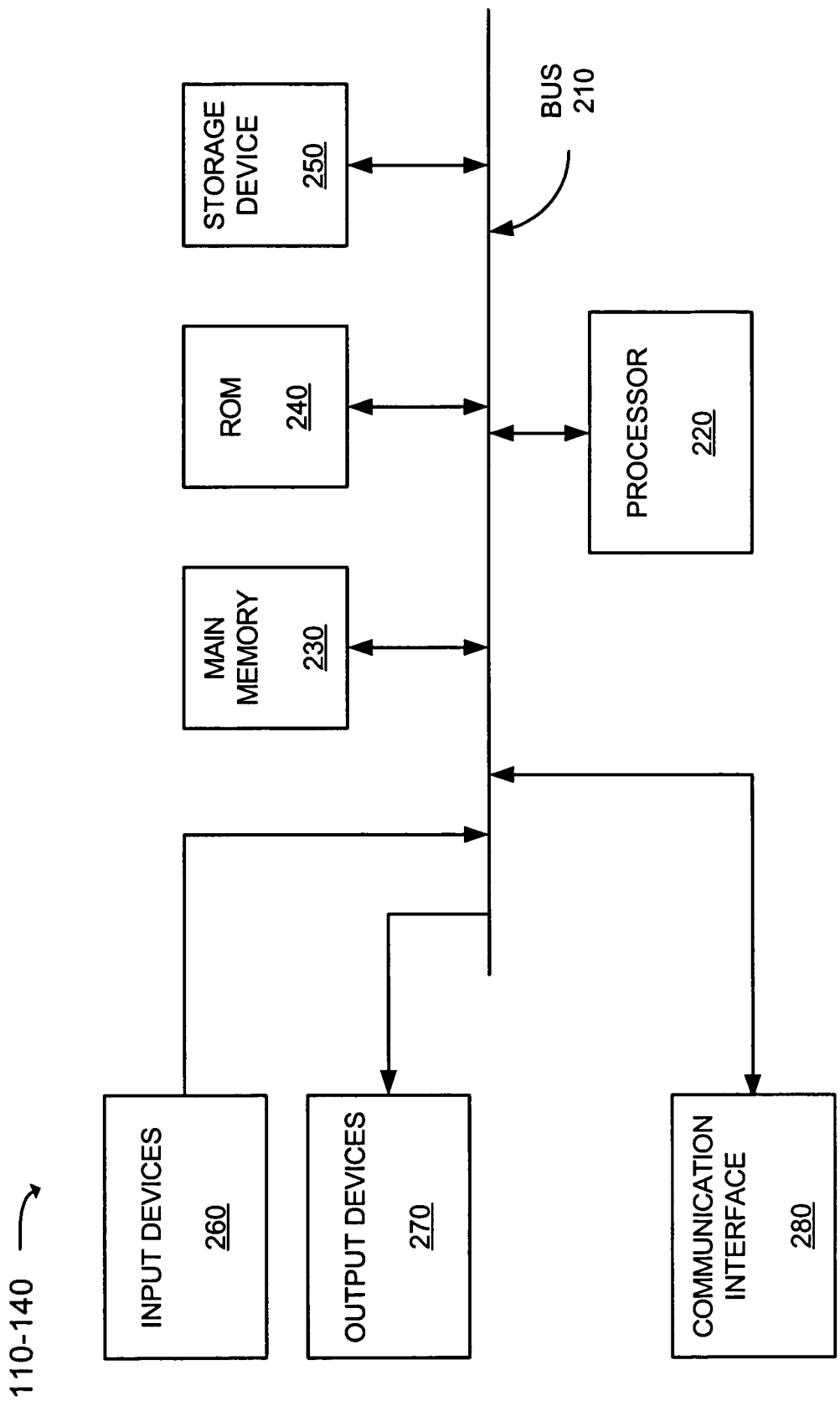
FIG. 2 is an exemplary diagram of a client and/or server of FIG. 1 in an implementation consistent with the principles of the invention.

FIG. 2 is an exemplary diagram of a client or server entity (hereinafter called "client/server entity"), which may correspond to one or more of clients 110 and servers 120-140, according to an implementation consistent with the principles of the invention. The client/server entity may include a bus 210, a processor 220, a main memory 230, a read only memory (ROM) 240, a storage device 250, one or more input devices 260, one or more output devices 270, and a communication interface 280. Bus 210 may include one or more conductors that permit communication among the components of the client/server entity.

Processor 220 may include one or more types of conventional processors or microprocessors that interpret and execute instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device(s) 260 may include one or more conventional mechanisms that permit an operator to input information to the client/server entity, such as a keyboard, a mouse, a pen, voice recognition and/or biometric mechanisms, etc. Output device(s) 270 may include one or more conventional mechanisms that output information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 150.

As will be described in detail below, the client/server entity, consistent with the principles of the invention, perform certain searching-related operations. The client/server entity may perform these operations in response to processor 220 executing software instructions contained in a computer-readable medium, such as memory 230. A computer-readable medium may be defined as one or more physical or logical memory devices and/or carrier waves.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Processing

FIGS. 3A, 3B, 3C and 3D are flowcharts of exemplary processing for creating and updating personalized newspaper documents according to an implementation consistent with the principles of the invention. As one skilled in the art will appreciate, the processing exemplified by FIGS. 3A, 3B, 3C and 3D can be implemented in software and stored on a computer-readable memory, such as main memory 230, ROM 240 or storage device 250 of server 120. Alternatively, the processing exemplified by FIGS. 3A, 3B, 3C and 3D can be implemented in hardwired circuitry, such as combinational logic, within server 120.

Figure 3A:
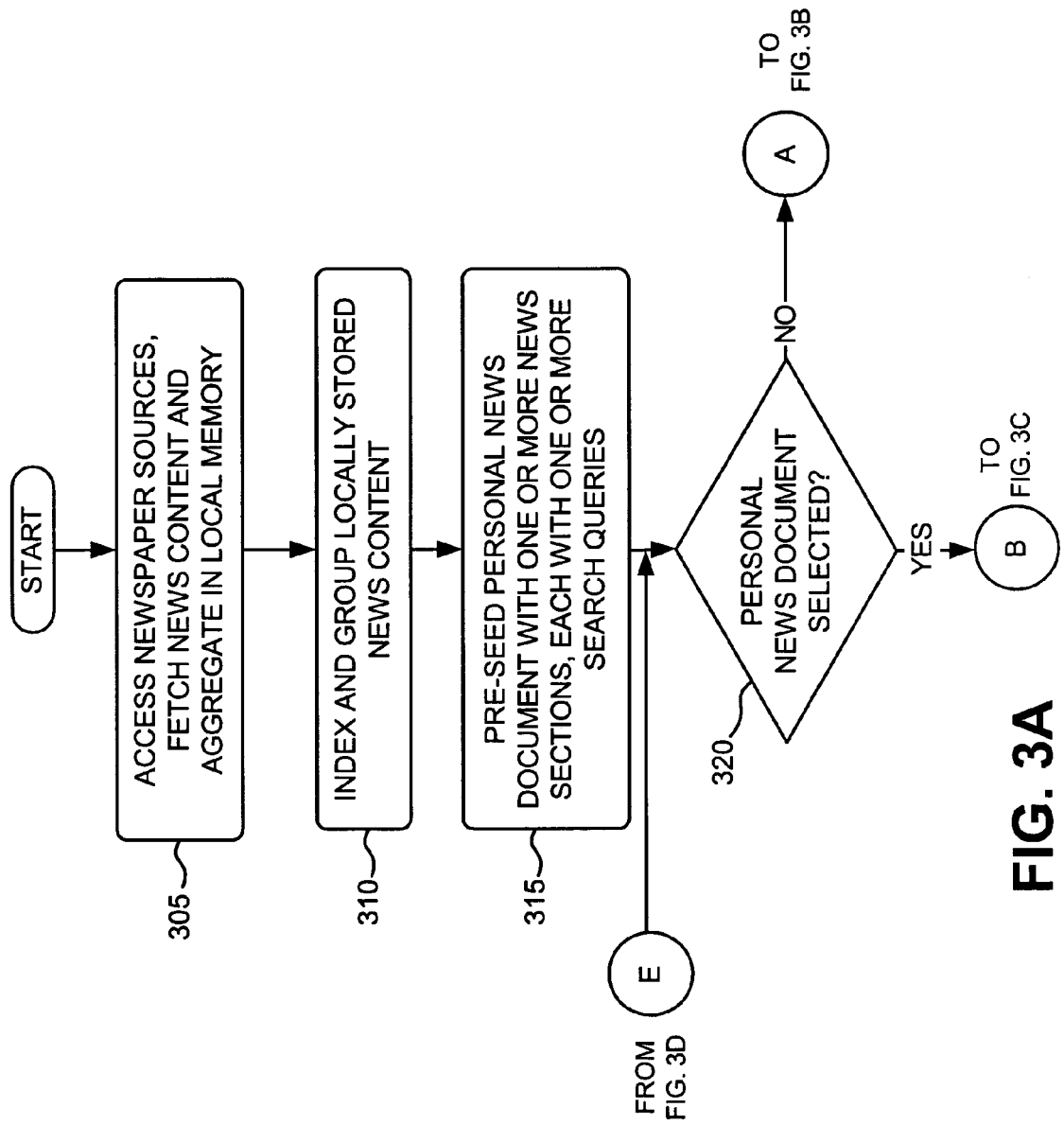

Processing may begin with server 120 accessing external news content (e.g., from server 130), fetching the news content and aggregating the fetched news content in a local memory (act 305)(FIG. 3A). For example, server 120 may use a news crawler (e.g., web robot) that may access news content documents hosted by news source server(s) 130. News source server(s) 130 may host, for example, news content from the Washington Post, the New York Times, or other news content sites. The fetched news content may then be indexed and grouped, using conventional indexing and grouping algorithms (act 310).

Server 120 may pre-seed a personal news document with one or more news sections, with each of the news sections including one or more search queries (act 315). The personal news page may include, for example, a personal news web page and may be stored on server 120 or server 140. A number of search queries may be supported by server 120, including the following search query forms: (a) one or more keywords (e.g., 'bush,' bush iraq,' etc.); (b) topical categories (e.g., 'topic=sports,' 'topic=sport-basketball'; (c) geographical categories (e.g., 'geo=usa,' 'geo=north america,' 'geo=china'); and/or (d) combinations of the above (e.g., 'tennis topic=sports', geo=europe'). For example, a personal "wireless" news section can be seeded with two queries: 'wireless topic=science' and 'cell phone topic=technology.' A search query may, thus, include a combination of one or more of the query forms above. Each of the news sections of the personal news document may be defined by an associated query.

Figure 3B:
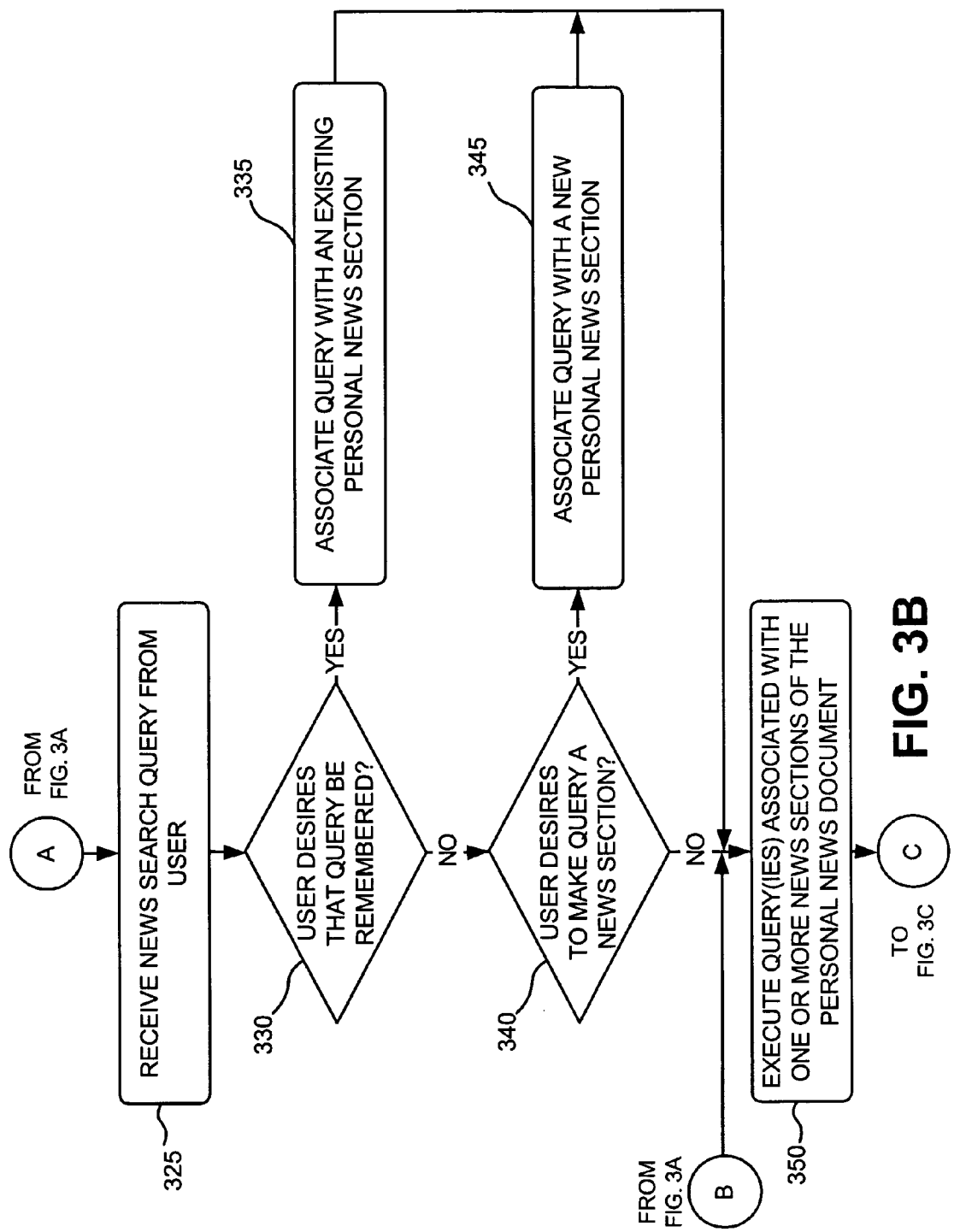
Figure 4:
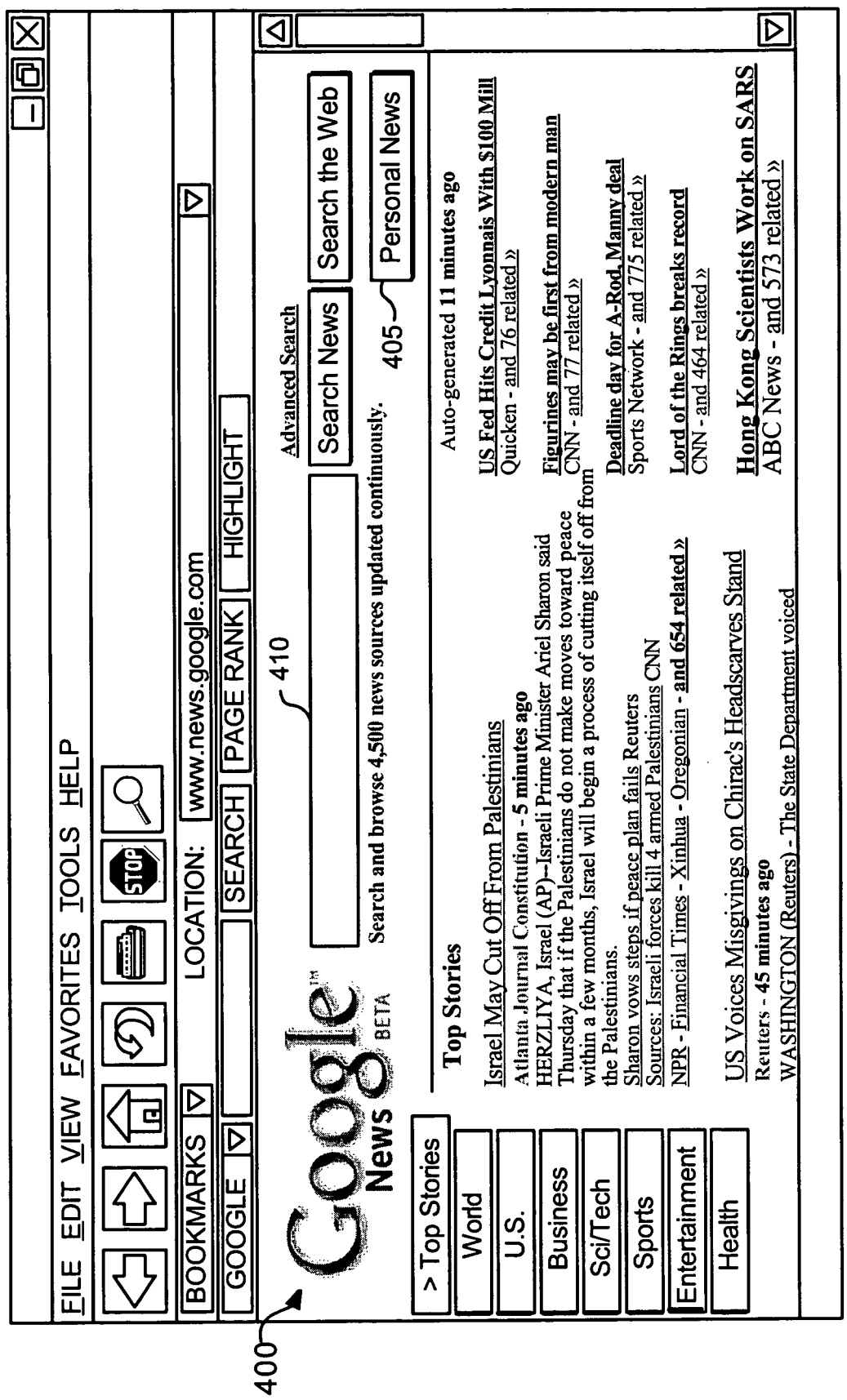
FIG. 4 is a diagram of an exemplary news aggregation search page according to an implementation consistent with the principles of the invention.
Figure 5:
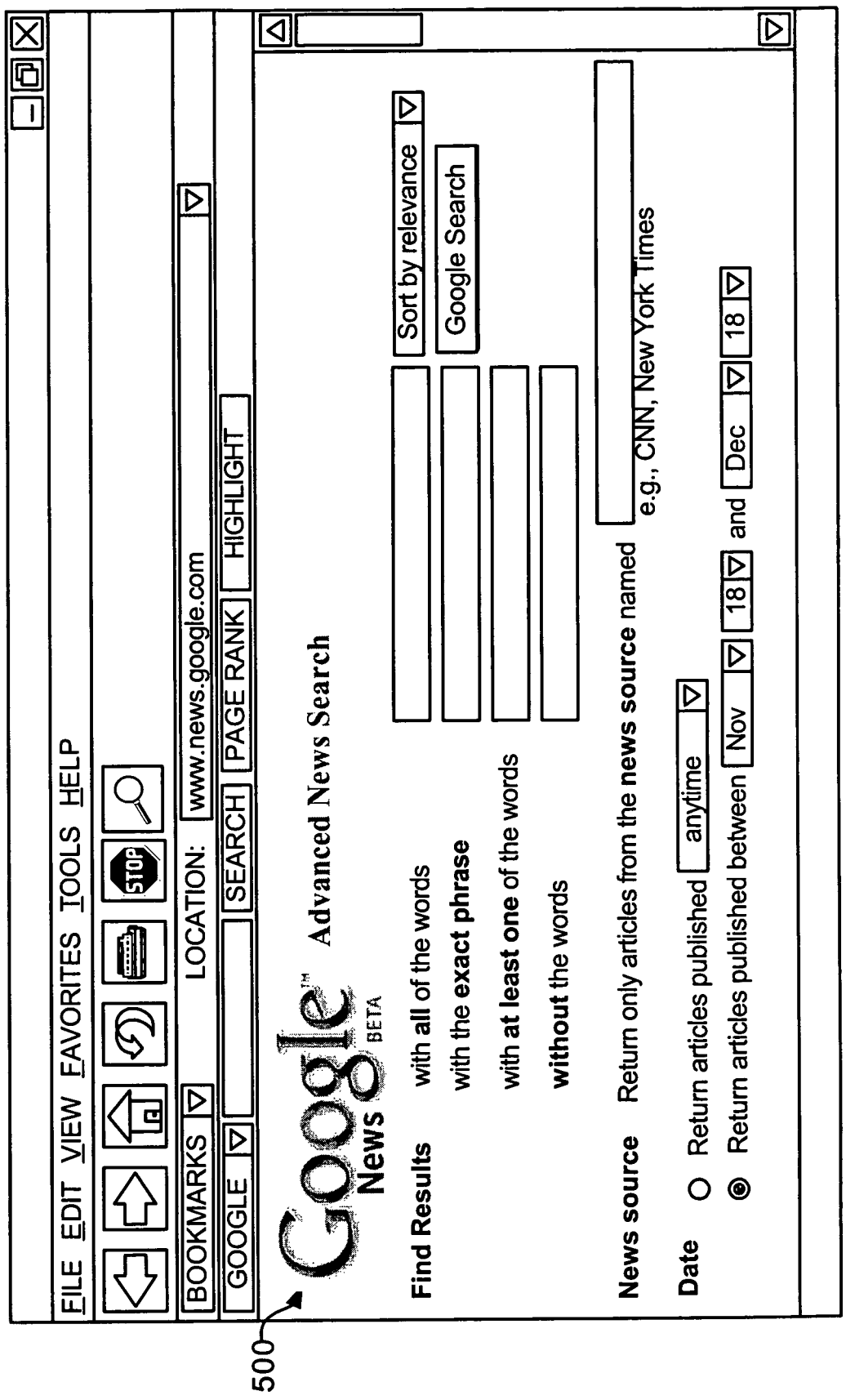
FIG. 5 is a diagram of an exemplary news aggregation advanced search page according to an implementation consistent with the principles of the invention.

Server 120 may determine whether a user, associated with a client 110, has selected his/her personal news document (act 320). For example, as shown in FIG. 4, a user may "click" on the "personal news" button 405 of a news search page 400 of a news aggregation service associated with server 120 to select his/her personal news document. If the user has selected his/her personal news document, processing may continue at act 350 (FIG. 3B). If not, server 120 may then receive a news search query from a user (act 325). For example, as shown in FIG. 4, a user may enter, in news search page 400, text in a search field 410. In another implementation, as shown in FIG. 5, a user may enter search text in a secondary "advanced news search" page 500 that may be readable from search page 400. Search page 500 may include various advanced search features that permit, for example, the user to search for news content based on publication date, exact phrases contained in the news content, etc. Furthermore, queries deployed by the user in the past may be ranked based on recency and frequency and made accessible through a menu placed on the search page. Selecting such a search query may reissue the query and generate a new news section. This list of queries can be automatically laid out as a newspaper with many sections distributed over many pages.

Server 120 may determine whether the user desires that the received search query be remembered (act 330). For example, server 120 may prompt the user with "Do you want to remember this search?" If the user desires that the received search query be remembered, server 120 may associate the search query with an existing news section of a personal news document associated with the user (act 335). If the user does not desire the received search query to be remembered, then server 120 may determine whether the user desires to make the received search query into a news section of the personal news document associated with the user (act 340). For example, server 120 may prompt the user with "Do you want to make this search a section?" If so, server 120 may associate the received search query with a new news section of the personal news document associated with the user (act 345). If the user does not desire to make the received search query into a news section, then server 120 may execute the queries associated with each of the one or more news sections of the user's personal news document (act 350). The results of the executed queries may be merged based on scores computed by search engine 125 to produce a final ranking which may form entries in the user's news sections.

Figure 3C:
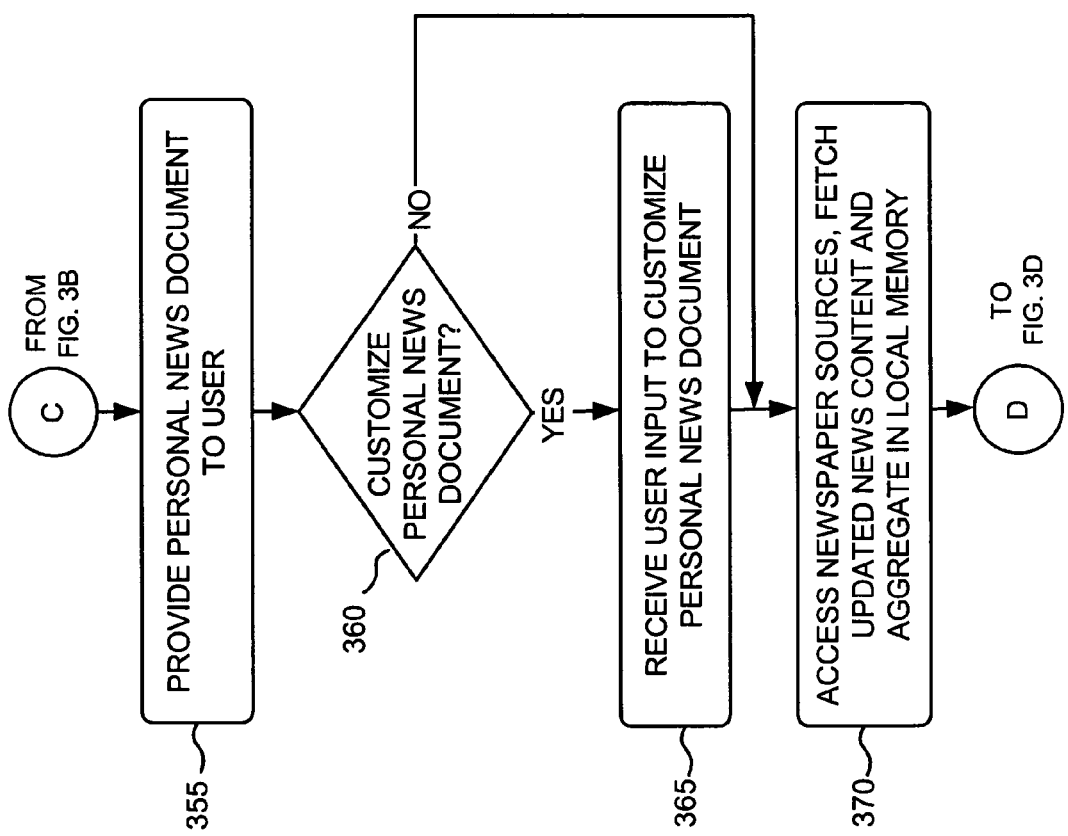
Figure 6:
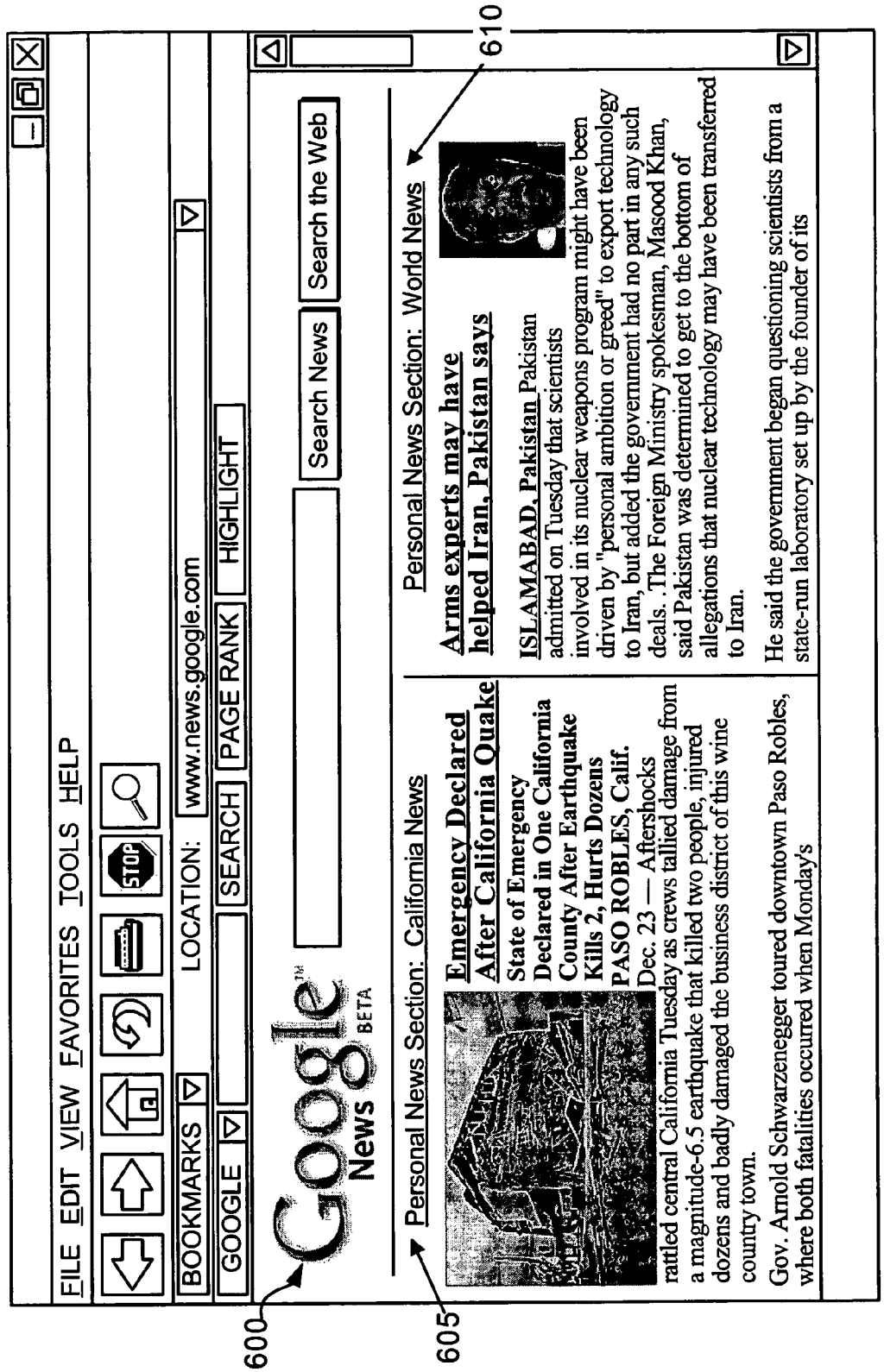
FIG. 6 is a diagram of an exemplary personal news document according to an implementation consistent with the principles of the invention.

Server 120 may then provide the user's personal news document to the user (act 355) (FIG. 3C). If server 120 hosts the user's personal news document, then server 120 may send one or more documents to the user containing the user's personal news document. If the user's personal news document is hosted on personal document server 140, then server 120 may send one or more documents to server 140 containing the user's personal news document. Server 120 may, additionally, direct the user's web browser to the documents hosted on server 140. The user's personal news document may be formatted similar to a human-compiled newspaper, with a title, short introduction, related story titles, data, photo, etc. By way of example, FIG. 6 illustrates a personal news document 600 that includes two news sections 605 and 610, "California News" and "World News," respectively. The user's personal news document may additionally be used to produce a similarly configured print newspaper in a viewable or hard copy format. For example, a postscript or pdf file may be produced that is portable for viewing and ready to print for offline reading. In one implementation, the layout of the print newspaper may be separately specified from the personal news document hosted on either servers 120 or 140.

Server 120 may determine whether the user desires to customize his/her personal news document (act 360). If not, processing may continue at act 370. If the user does desire to customize his/her personal news document, then server 120 may receive input from the user to customize the personal news document associated with the user (act 365). An interactive program (known as a Wizard) may execute at server 120, or at the client 110 associated with the user, to walk the user through the process of adding news sections, placing them appropriately, and customizing their look and feel.

In one implementation consistent with the principles of the invention, users may customize their personal news document in various ways, including the following: (a) adding a new section seeded with new queries; (b) changing the appearance or location of a news section or the queries associated with a news section; (c) moving news sections around (e.g., from top left of news page to bottom right, from 2 columns to 1 column layout, etc.); (d) deleting a news section; (e) changing display properties for news within a news section (e.g., deciding how many stories the news section should have, how many related titles within a story, whether images should be shown, etc.); and (f) changing ranking properties within a news section. When changing ranking properties within a news section, the user may decide how freshness of the news content should be valued, such as, for example, sorting news content by time, by importance, or by some combination, or by providing hints for ranking certain types of stories above other stories. Additionally, the user may indicate that a certain kind of news source (e.g., New York Times, sources in USA, etc.) may be preferred or not preferred. Also, the user may provide general keywords that are of interest to the user (e.g., San Francisco) and stories with these keywords should be boosted. Further, the user can list journalists they like or do not like or genres they like or do not like (e.g., opinion/commentary vs. breaking news vs. briefs vs. full coverage).

Those skilled in the art will appreciate that various combinations of the above customization options/parameters, or other customization options/parameters, may be provided in other implementations consistent with the principles of the invention. Those skilled in the art can further devise user interfaces that allow such preferences to be expressed either in the context of one particular news section, or all news sections together. Various user preferences (e.g., selected options/parameters) for customizing a personal news document may be stored at server 120, server 140, or at a client 110 associated with the user, or at some combination of server 120, server 140, or client 110. To access the user preference (s), a "cookie," or an identifier contained in a "cookie" that is, in turn, mapped to the stored user preferences, may be used in some implementations consistent with the principles of the invention. During the personal news document customization process, a user may make their personal news document available to other users through a registry where personal news documents are registered. Other users may then search this registry and view and copy news sections that other users have created.

Server 120 may access external news content (e.g., from server 130), fetch updated news content and aggregate the updated news content in local memory (act 370). For example, server 120 may use a news crawler (e.g., web robot)

that may access updated news content documents hosted by news source server(s) 130. The fetched updated news content may be indexed and grouped, using conventional indexing and grouping algorithms (act 375) (FIG. 3D). Server 120 may then, periodically, execute a query(ies) associated with one or more news sections of the user's personal news document (act 380). Server 120 may, optionally, notify the user of any updates to news sections of the user's personal news document based on the result of the executed search of the updated news content (act 385). Server 120 may implement a news alert service that may notify the user via, for example, a page, an e-mail, a FAX, or a telephone call, that their personal news document has been updated. The user may be notified at stipulated intervals, or only when updated news content for their personal news document exists. The notification from server 120 may include the actual news updates (e.g., an e-mail may include a summary of an updated news story), or the notification may only include a brief textual or oral notification that the user can access their personal news document to retrieve the updated news content. Processing may then return to act 320 (FIG. 3A) to determine if the user has again selected his/her personal news document.

CONCLUSION

Systems and methods consistent with the principles of the invention may use previously stored user searches to automatically, and periodically, provide a personal news document to the user that includes personalized news content. The user may customize the content and format of the personal news document via a user interface implemented at a server associated with the news browsing service, or at a client associated with the user.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 3A, 3B, 3C and 3D, the order of the acts may be modified in other implementations consistent with the principles of the invention. Also, non-dependent acts may be performed in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects of the invention were described without reference to the specific software code—it being understood that one of ordinary skill in the art would be able to design software and control hardware to implement the aspects based on the description herein.

What is claimed is:

1. A method comprising:
   crawling, by one or more processors, news content documents hosted by a plurality of news source servers;
   fetching, by one or more processors, news content from the crawled news content documents;
   indexing, by one or more processors, the fetched news content to produce indexed news content;
   receiving, at one or more processors, a plurality of search queries from a client device;
   creating, by one or more processors, a customized news document including a plurality of personalized news sections,
      each personalized news section, of the plurality of personalized news sections, being defined by a different search query of the plurality of search queries,
      the personalized news sections being capable of being displayed at a same time when the customized news document is rendered;
   identifying, by one or more processors, a number of news items to include in each personalized news section of the plurality of personalized news sections;
   identifying, by one or more processors, a user-specified manner of ranking news items in each personalized news section of the plurality of personalized news sections;
   identifying, by one or more processors, items of news content from the indexed news content using the plurality of search queries;
   identifying, by one or more processors and for a particular personalized news section of the plurality of personalized news sections, selected items of news content of the identified items of news content corresponding to the identified number of news items for the particular personalized news section;
   modifying, by one or more processors, a ranking of the selected items of news content using the user-specified manner of ranking for the particular personalized news section; and
   providing, by the one or more processors, the selected items of news content for insertion into the particular personalized news sections of the customized news document according to the modified rankings.

2. The method of claim 1, further comprising:
   retrieving updated items of news content from the indexed news content using the plurality of search queries; and
   periodically inserting selected items of news content of the updated items of news content, corresponding to the identified number of news items for the particular personalized news section, into the particular personalized news section of the plurality of the personalized news sections of the customized news document.

3. The method of claim 1, where the items of news content are retrieved from a plurality of news source servers and aggregated via a news aggregation service in the memory.

4. The method of claim 3, where the customized news document is hosted at a news aggregation server that further hosts the news aggregation service.

5. The method of claim 3, where the customized news document is hosted at a server that is remote from a news aggregation server that hosts the news aggregation service.

6. The method of claim 2, further comprising:
   notifying the client device of the updated items of news content.

7. The method of claim 6, where notifying the client device of the updated items of news content comprises notifying a user of the client device via at least one of a page, an e-mail, a fax, or a telephone call.

8. The method of claim 1, further comprising:
   registering the customized news document with a registry; and
   providing access for other users to the customized news document via the registry.

9. The method of claim 1, where
   identifying items of news content from the indexed news content comprises:

searching the indexed news content based on the plurality of search queries to identify the items of news content.

10. A news aggregation server comprising:
a memory to store instructions and indexed news content; and
a processor to execute the instructions in memory to:
crawl news content documents hosted by a plurality of news source servers,
fetch news content from the crawled news content documents,
index the fetched news content to produce the indexed news content,
obtain a plurality of search queries from a user,
create a customized news document including a plurality of personalized news sections,
each news section being defined by a different search query of the plurality of search queries,
the plurality of personalized news sections being capable of being displayed at a same time when the customized news document is rendered,
identify items of news content from the memory using the plurality of search queries,
identify a user-specified number of news items to include in each personalized news section of the plurality of personalized news sections,
identify a user-specified manner of ranking news items within each personalized news section of the plurality of personalized news sections,
the identified user-specified manner of ranking news items for one personalized news section of the plurality of personalized news section differing from the user-specified identified manner of ranking news items for another personalized news section of the plurality of personalized news sections,
rank, based on the identified user-specified manner of ranking news items, selected items of news content, of the identified items of news content, in a ranked order, and
insert the user-specified number of the selected items of news content, of the identified items of news content, in the ranked order into the one personalized news section of the customized news document.

11. The news aggregation server of claim 10, where the processor is further to execute the instructions in memory to:
retrieve updated items of news content using the plurality of search queries; and
periodically insert selected items of new content of the updated items of news content in the ranked order into the at least one of the plurality of personalized news sections of the customized news document.

12. The news aggregation server of claim 10, where the items of news content are aggregated via a news aggregation service in the memory.

13. A system comprising:
one or more processors to:
crawl news content documents hosted by a plurality of news source servers;
fetch news content from the crawled news content documents;
index the fetched news content to produce indexed news content;
receive a plurality of search queries from a user;
create a customized news document including a plurality of personalized news sections,
each personalized news section, of the plurality of personalized news sections, being defined by a different search query of the plurality of search queries,
the plurality of personalized news sections being capable of being displayed at a same time when the customized news document is rendered;
identify a number of news items to include in each personalized news section of the plurality of personalized news sections;
identify a user-specified manner of ranking news items in each personalized news section of the plurality of personalized news sections;
identify items of news content from the indexed news content using the plurality of search queries;
identify, for a particular personalized news section of the plurality of personalized news sections, selected items of news content, of the identified items of news content, corresponding to the identified number of news items for the particular personalized news section;
rank the selected items of news content in the user-specified manner for the particular personalized news section; and
insert the ranked items of news content into the particular personalized news section of the customized news document.

14. The system of claim 13, where the one or more processors are further to:
register the customized news document with a registry; and
provide access, for other users, to the customized news document via the registry.

15. A method comprising:
crawling, by one or more processors, news content documents hosted by a plurality of news source servers;
fetching, by one or more processors, news content from the crawled news content documents;
indexing, by one or more processors, the fetched news content to produce indexed news content;
dividing, by one or more processors, a news document into a plurality of news sections, the news sections being capable of being displayed at a same time when the news document is rendered;
receiving, at one or more processors, a first search query and a second search query from a client device;
identifying, by one or more processors, a first user-specified manner of ranking news items within a first news section of the plurality of news sections and a second user-specified manner of ranking news items within a second news section of the plurality of news sections;
identifying, by one or more processors, a first user-specified number of news items to include within the first news section and a second user-specified number of news items to include within the second news section;
searching, by one or more processors, news content based on the first search query to obtain a first set of related news items;
ranking, by one or more processors, based on the identified first user-specified manner of ranking news items, the first set of related news items in a first ranked order;
searching, by one or more processors, the news content based on the second search query to obtain a second set of related news items;
ranking, by one or more processors, based on the identified second user-specified manner of ranking news items, the second set of related news items in a second ranked order;

populating, by one or more processors, the first news section of the plurality of news sections with the first user-specified number of news items of the first set of related news items in the first ranked order; and populating, by one or more processors, the second news section of the plurality of news sections with the second user-specified number of news items of the second set of related news items in the second ranked order.

16. The method of claim 15, where the first search query and the second search query are received from the client device via a network.

17. The method of claim 15, where the first search query and the second search query are selected by a user of the client device from a list of search queries.

18. The method of claim 17, where the list of search queries comprises search queries previously used by the user to search the news content.

19. The method of claim 15, further comprising:
identifying one or more preferences for certain kinds of news sources for the news content,
where searching the news content based on the first search query is further based on the one or more preferences.

20. The method of claim 15, where ranking, based on the identified first user-specified manner of ranking news items, the first set of related news items in the first ranked order comprises:
receiving selected keywords from a user; and
boosting selected news items of the first set of related news items higher in the ranked order when the selected news items contain one or more of the selected keywords.

21. The method of claim 15, further comprising:
identifying preferences for journalists who author news items of the news content,
where searching the news content based on the first search query is further based on the identified preferences for journalists.

22. The method of claim 15, further comprising:
identifying preferences for genres of news among the news content,
where searching the news content based on the first search query is further based on the identified preferences for genres of news.

23. The method of claim 15, further comprising:
deleting the first news section from the news document based on an instruction received from a user.

24. The method of claim 15, further comprising:
labeling, on the news document, the first news section with a first label related to the first search query.

25. The method of claim 24, further comprising:
labeling, on the news document, the second news section with a second label related to the second search query.

26. The method of claim 15, where the first search query and the second search query are received from a user, and the method further includes:
providing the news document to the user.

27. A non-transitory computer-readable memory device containing instructions for execution by one or more processors, the instructions comprising:
one or more instructions that, when executed by the one or more processors, cause the one or more processors to:
crawl news content documents hosted by a plurality of news source servers;
fetch news content from the crawled news content documents;
index the fetched news content to produce indexed news content;
divide a news document into a plurality of news sections, the plurality of news sections being capable of being displayed at a same time when the customized news document is rendered,
each news section of the plurality of news sections corresponding to a different search query;
receive a plurality of personalized search queries from a user;
identify a number of news items to include in each news section of the plurality of news sections;
identify a user-specified manner of ranking news items in each news section;
search the indexed news content based on a personalized search query, of the plurality of personalized search queries, to obtain a first set of related news items;
identify selected news items, of the first set of related news items, corresponding to the identified number of news items for a particular news section of the plurality of news sections;
rank the selected news items based on the identified user-specified manner of ranking; and
populate only the particular news section, of the plurality of news sections of the news document, with the ranked news items.

28. The non-transitory computer-readable memory device of claim 27, where the personalized search query is received from the user via a network.

29. The non-transitory computer-readable memory device of claim 27, where the personalized search query is selected by the user from a list of search queries.

30. The non-transitory computer-readable memory device of claim 29, where the list of search queries comprises search queries previously used by the user to search the news content.

31. The non-transitory computer-readable memory device of claim 27, the instructions further comprising:
one or more instructions that, when executed by the one or more processors, cause the one or more processors to identify one or more preferences for certain kinds of news sources for the news content,
where the instructions that cause the one or more processors to search the news content based on the personalized search query include one or more instructions that cause the one or more processors to search the news content based on the one or more preferences.

32. The non-transitory computer-readable memory device of claim 27, the instructions further comprising:
one or more instructions that, when executed by the one or more processors, cause the one or more processors to:
receive selected keywords from the user; and
rank selected news items of the first set of related news items based on the selected keywords.

33. The non-transitory computer-readable memory device of claim 27, the instructions further comprising:
one or more instructions that, when executed by the one or more processors, cause the one or more processors to identify preferences for journalists who author news items of the news content,
where the instructions that cause the one or more processors to search the news content based on the personalized search query include one or more instructions that cause the one or more processors to search the news content based on the identified preferences for journalists.

34. The non-transitory computer-readable memory device of claim 27, the instructions further comprising:

one or more instructions that, when executed by the one or more processors, cause the one or more processors to identify preferences for genres of news among the news content, where the instructions that cause the one or more processors to search the news content based on the personalized search query include one or more instructions that cause the one or more processors to search the news content based on the identified preferences for genres of news.

35. The computer-readable memory device of claim 27, the instructions further comprising:

one or more instructions that, when executed by the one or more processors, cause the one or more processors to provide the news document to the user.

36. A method comprising:

crawling, by one or more processors and using a web robot, news content documents hosted by a plurality of news source servers;

fetching, by one or more processors, news content from the crawled news content documents;

indexing, by one or more processors, the fetched news content to produce indexed news content;

dividing, by one or more processors, a news document into a plurality of news sections,
- each news section, of the plurality of news sections, being capable of being displayed at a same time when the customized news document is rendered;

receiving, by one or more processors, a plurality of user search queries from a client device via a communication interface;

identifying, by one or more processors, a user-specified manner of ranking news items within each news section of the plurality of news sections of the news document;

identifying, by one or more processors, a number of news items to include in each news section;

searching, by one or more processors, the indexed news content based on a user search query, of the plurality of user search queries, to obtain a first plurality of related news items;

identifying, by one or more processors, selected news items, of the first plurality of related news items, corresponding to an identified number of news items associated with a first news section of the plurality of news sections;

modifying, by one or more processors, a ranking of the selected news items based on a user-specified manner of ranking news items associated with the first news section; and populating, by one or more processors, only the first news section of the plurality of news sections of the news document with the selected news items.

37. The method of claim 36, where the news document comprises a web page.

38. The method of claim 36, further comprising:

obtaining a second plurality of related news items from the fetched news content; and populating a second news section, of the plurality of news sections of the news document, with the second plurality of related news items, where the second news section is different than the first news section.

39. The method of claim 36, further comprising:

searching the indexed news content based on a second user search query to obtain a second plurality of related news items; and populating only a second news section, of the plurality of news sections of the news document, with the second plurality of related news items.

* * * * *